Feb. 27, 1923.
F. MELLA.
EXPOSURE METER.
FILED JUNE 11, 1921.
1,447,097.
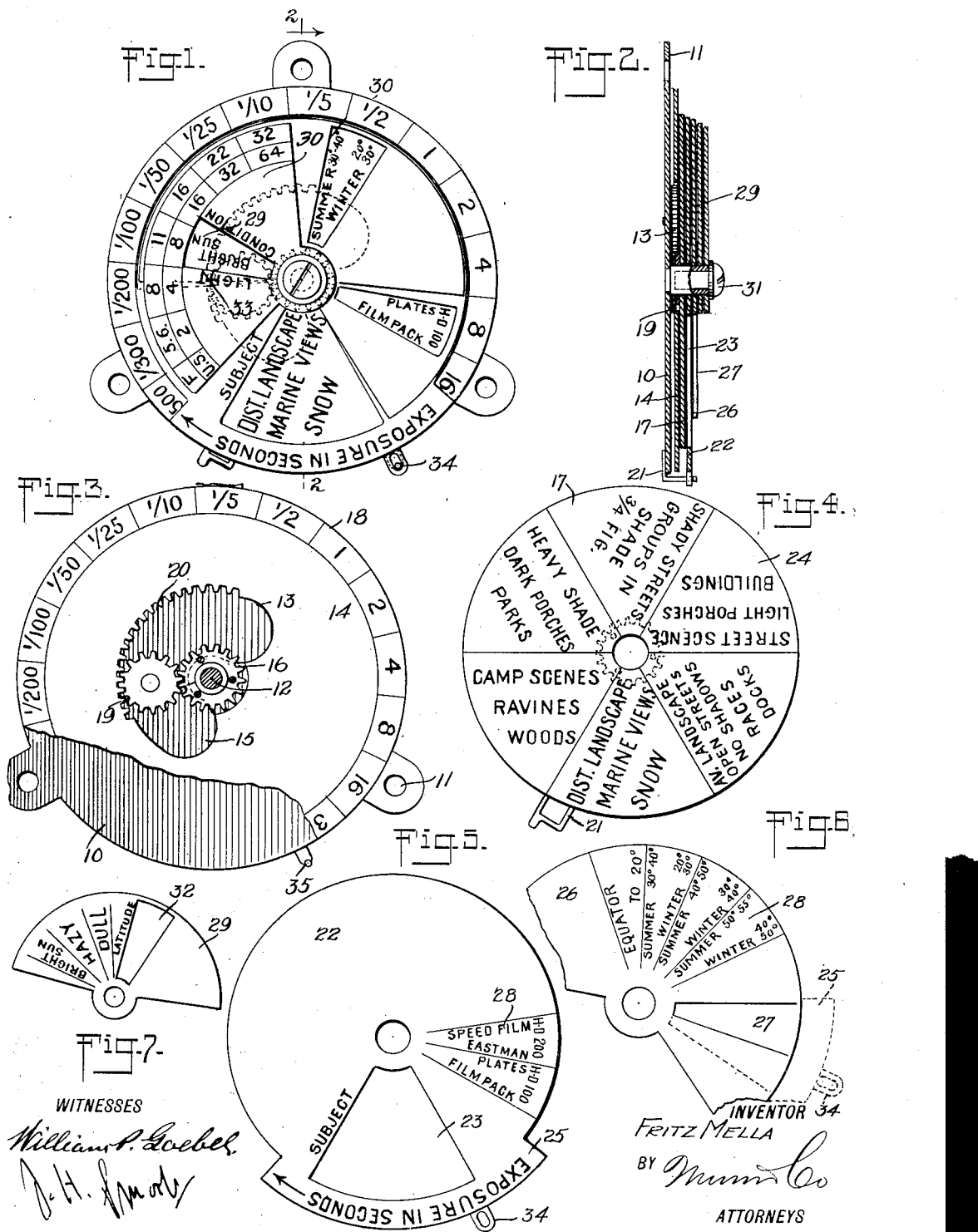
WITNESSES
William P. Goebel
J. H. Smody
INVENTOR
FRITZ MELLA
BY Munn & Co
ATTORNEYS Patented Feb. 27, 1923.

1,447,097

UNITED STATES PATENT OFFICE.

FRITZ MELLA, OF SANTIAGO, CHILE, SOUTH AMERICA.

EXPOSURE METER.

Application filed June 11, 1921. Serial No. 476,821.

*To all whom it may concern:*

Be it known that I, FRITZ MELLA, a citizen of the United States, and resident of Santiago, Chile, South America, have invented a new and Improved Exposure Meter, of which the following is a full, clear, and exact description.

My invention relates to a meter and aims to provide certain new and useful improvements, more particularly in a meter adapted for use in connection with the taking of pictures.

More particularly my invention has reference to a meter which is capable of being used by an amateur, and relies upon the well-known arithmetical formula of combining the various factors that govern the length of exposure, i. e. subject, equipment and light, the latter depending on latitude, season, etc.

The object of the invention is the construction of a device of the nature specified by means of which an amateur may set various elements to correspond to known conditions, whereby to obtain a final reading which may be implicitly relied upon to produce a perfect result in photography.

Reference is had to the attached sheet of drawings as illustrating practical embodiments of my invention, and in which—

Figure 1 is a top plan view of the device and showing the same in use.

Figure 2 is a sectional side view taken along the line 2—2 of Figure 1.

Figure 3 illustrates the base of the meter and the dial associated therewith.

Figure 4 shows the next overlying dial.

Figure 5 illustrates a dial which may be optionally used for a purpose hereinafter specified.

Figure 6 is a dial which may be used in conjunction with the dial illustrated in Figure 5, or in lieu thereof if the latter dial is eliminated, and Figure 7 shows a segmental dial which overlies the dial illustrated in Figure 6, and underlies the topmost segmental dial illustrated in Figure 1.

Referring now more particularly to Figure 3 it will be seen that the meter includes a base 10, which remains relatively affixed and may be secured by means of lugs 11 to the body of the camera. A central post 12 is secured to the base 10 and extends upwardly therefrom, and a gear wheel 13 is rotatably secured to the base and eccentrically disposed thereon. A dial 14 is positioned upon the base 10 and is formed with an arcuate opening 15 extending adjacent the center portion, and this dial is rotatably associated with the post 12 by means of an ear 16 which is in movable contact with the said post.

A second dial 17 is formed with a central opening through which the post 12 is adapted to extend and this second dial is of a diameter less than the dial 14 so that the graduations 18 thereon may be visible. Furthermore the second dial carries a gear 19 fixedly secured to its under face and concentrical with its central opening. As has been illustrated in Figure 3 this gear encircles the post 12 and is of a diameter substantially equal to that of the gear 13, which latter meshes with teeth 20 formed in the side edges of the arcuate opening 15 aforementioned. Thus it will be obvious that upon the dial 17 being rotated by means of the finger piece 21, that this will cause a rotation being imparted to the gear 13 by means of a gear 19, the gear 13 in turn causing a movement of the dial 14 by means of the teeth 20 in a direction opposite to the movement imparted to the dial 17 for a purpose hereinafter specified.

As has been brought out in the brief description of the figures, the dial illustrated in Figure 6 may be employed in conjunction with the dial shown in Figure 5, or used independently of the latter. Assuming the former to be the case the dial 22 is next mounted upon the post 12 and this dial is formed with an opening 23 of a size permitting of the sub-divisions of reading matter 24 appearing upon the dial 17 to be read through the same. Furthermore there appears in the edge of the dial 22 an outwardly extending portion 25 the outer edge of which aligns substantially with the outer end of the graduations 18 of the dial 14.

The dial 26 shown in Figure 6 is now mounted upon the post 12 and it is to be noted that this dial is also formed with a cutout portion 27 through which the reading matter 28 appearing upon the dial 22 may be read, and finally the segmental dials 29 and 30 shown in Figure 7 are mounted upon the post 12, the whole being secured in applied position by any suitable means such as a screw 31, it being noted that both of the last named dials are formed with openings 32 and 33 respectively, permitting of an observation of the reading matter upon underlying dials.

If, however, the dial 22 shown in Figure 5 is dispensed with, the dial 26 in Figure 6 has its opening 27 enlarged to the size of the opening 23 of the dial 22, as has been shown in dotted lines in Figure 6. Further an outwardly extending portion also indicated in dotted lines is provided, which outwardly extending portion corresponds to the portion 25 of the dial 22. Thus if the dial specified is utilized without the dial 22, the reading of the subject matter included in the subdivisions 24 of the dial 17 may be effected, and furthermore the outwardly extending portion will align with the graduations 18 of the dial 14 and permit of a proper reading thereof as by means of the dial 22.

In order to minimize any chance of a shifting of dial 22 relative to its underlying dials, when such dials have been properly relatively set, it will be noted that dial 22 carries an ear 34 adapted to be engaged over a finger 35 carried by base 10, but when the dial 22 is dispensed with and the dial 26 is then constructed as described in the paragraph immediately preceeding, the latter dial is also further changed in construction to carry the ear 34 as indicated in broken lines in Fig. 6, so that, in order to minimize any chance of a shifting of dial 26 relative to its underlying dials, when such dials have been properly relatively set, the ear 34 of dial 26 may be engaged over the finger 35 carried by base 10.

In operation, the dial 22, or if desired, as just explained, the dial 26, together with the underlying dials 14 and 17, are properly set and the ear 34 and finger 35 are engaged; and, whether or not the dial 22 is present, it will be understood that the operator also sets the dial 29 of Fig. 7, to align with the reading matter on dial 26 immediately underlying the same, and also properly sets the two segmental dials 29 and 30 overlying the dial 26, whereby, finally, a glance at the uppermost dial 30 and exposed marginal portion of the lowermost dial 14, shows him the correct exposure on the lowermost dial corresponding to the selected "Stop" on the uppermost dial.

With regard to the use of the dial 22 which is interposed between the dial 26 and the dial 17 it is pointed out that this dial bears reading matter permitting an adjustment to correspond to the greater or less sensitive nature of the type of negative utilized, and assuming that this dial is used, it will be seen that one more adjustment in addition to the adjustments aforementioned is required, to wit, that the reading matter 28 upon the dial 22 must be brought in alignment upon the dial 22.

Thus the objects of my invention are accomplished, and it will be appreciated that numerous modifications of structure might readily be resorted to without in the least departing from the spirit of my invention, which I claim as:

1. An exposure meter including a plurality of dials rotatably connected one to the other, and means cooperating with the lower-most two dials for causing a movement of one of said dials in a direction opposite the second dial when the latter is moved, such plurality of dials also including dials overlying the dials already mentioned, said overlying dials being formed with openings whereby readings of one of the lower dials may be made.

2. An exposure meter including a plurality of dials rotatably connected together, a finger piece secured to a dial immediately overlying the lowermost dial, said finger projecting beyond said lowermost dial, and means extending between said dials for effecting a reversal of motion of the lowermost dial when the first named dial is swung in one direction, such plurality of dials also including dials overlying the dials already mentioned, said overlying dials being formed with openings whereby readings of one of the lower dials may be made.

3. An exposure meter including a plurality of dials, a post rotatably connecting said dials one to the other, a base mounting said post, the lowermost dial being formed with an arcuate slot formed with teeth in one of its edges, a gear meshing with said teeth, said gear being rotatably mounted upon said base and eccentrically disposed with respect to said center post, and a gear fixedly carried by that dial overlying the lowermost dial, said gear meshing with a gear associated with said base, such plurality of dials also including dials overlying the dials already mentioned, said overlying dials being formed with openings whereby readings of one of the lower dials may be made.

4. An exposure meter including a plurality of dials, a base, a center post connected to said base, said dials being formed with an opening through which said center post is adapted to extend to rotatably support the same, the lowermost dial being formed with an arcuate slot to one side of its central opening, and having teeth formed in one of the side edges of said slot, a gear rotatably secured to said post and eccentrically disposed with respect to said center post, and a gear fixedly secured to the dial overlying the lowermost dial, said gear being concentrically arranged with respect to the central opening, of said dial and meshing with a gear secured to said post, such plurality of dials also including dials overlying the dials already mentioned, said overlying dials being formed with openings whereby readings on one of the lower dials may be made.

5. An exposure meter including a plurality of dials rotatably connected one to the other, a base supporting said dials, a finger fixedly secured to said base and an ear secured to one of the dials upon said base, said ear being formed with an opening adapted to be engaged by said finger whereby to retain said dial fixed with respect to said base, such plurality of dials also including dials overlying the dials already mentioned, said overlying dials being formed with openings whereby readings of one of the lower dials may be made.

6. An exposure meter including a plurality of dials rotatably connected one to the other, the upper of said dials being formed with openings adapted to permit of the reading matter carried by underlying dials being read, all of said dials being of a diameter less than the lowermost dial, and an extended portion forming a part of one of the dials and extending to a plane substantially equal to the plane into which the edge of the lowermost dial extends.

7. An exposure meter including a plurality of dials rotatably connected one to the other, an ear carried by one of said dials, and extending outwardly therefrom, and a finger fixed relative to the dials and adapted to be extended through an opening in said ear, said dials being formed with openings.

FRITZ MELLA.